United States Patent
Prasad

(10) Patent No.: US 10,713,062 B2
(45) Date of Patent: Jul. 14, 2020

(54) SYSTEM AND METHOD FOR CONFIGURING AN INFORMATION HANDLING SYSTEM

(71) Applicant: DELL PRODUCTS, LP, Round Rock, TX (US)

(72) Inventor: Aditya Prasad, Fremont, CA (US)

(73) Assignee: Dell Products, L.P., Round Rock, TX (US)

( * ) Notice: Subject to any disclaimer, the term of this patent is extended or adjusted under 35 U.S.C. 154(b) by 189 days.

(21) Appl. No.: 15/834,818

(22) Filed: Dec. 7, 2017

(65) Prior Publication Data

US 2019/0179645 A1   Jun. 13, 2019

(51) Int. Cl.

| H04L 12/66 | (2006.01) |
|---|---|
| G06F 9/4401 | (2018.01) |
| H04L 29/08 | (2006.01) |
| G06F 8/60 | (2018.01) |
| H04L 12/24 | (2006.01) |

(52) U.S. Cl.
CPC ............ *G06F 9/4416* (2013.01); *G06F 8/60* (2013.01); *H04L 12/66* (2013.01); *H04L 41/0806* (2013.01); *H04L 67/1042* (2013.01); *H04L 41/0803* (2013.01)

(58) Field of Classification Search
CPC . H04L 12/66; H04L 67/1042; H04L 41/0803; H04L 41/0806; H04M 7/0063; G05B 19/054; H04W 74/04; H04W 74/0816; G06F 9/44164; G06F 8/60
See application file for complete search history.

(56) References Cited

U.S. PATENT DOCUMENTS

| 6,687,817 | B1 * | 2/2004 | Paul | H04L 41/0806 |
|---|---|---|---|---|
| | | | | 709/220 |
| 8,127,124 | B2 | 2/2012 | Proudler | |
| 2007/0078940 | A1 | 4/2007 | Fineberg et al. | |
| 2009/0172223 | A1 * | 7/2009 | Lee | G05B 19/054 |
| | | | | 710/104 |
| 2012/0177032 | A1 * | 7/2012 | Chitty | H04L 12/66 |
| | | | | 370/352 |
| 2012/0268259 | A1 | 10/2012 | Igel et al. | |
| 2013/0223358 | A1 * | 8/2013 | Wentink | H04W 74/04 |
| | | | | 370/329 |

\* cited by examiner

*Primary Examiner* — Kyung H Shin
(74) *Attorney, Agent, or Firm* — Larson Newman, LLP

(57) ABSTRACT

A peer configuration system provides a configuration file via peer-to-peer networking. A master device stores a peer configuration. Whenever any peer device requires configuration, the peer device assumes a slave role and queries the master device to retrieve the peer configuration. The peer configuration is thus propagated via peer-to-peer networking to the peer device. The peer device boots-up using the peer configuration retrieved from the master device.

20 Claims, 9 Drawing Sheets

SYSTEM AND METHOD FOR CONFIGURING AN INFORMATION HANDLING SYSTEM

FIELD OF THE DISCLOSURE

The present disclosure generally relates to information handling systems, and more particularly relates to configuring an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system provides a configuration file via peer-to-peer networking. A master device in the peer configuration system stores a master configuration file. Whenever any peer device requires configuration, the peer device assumes a slave role and queries the master device to retrieve the peer configuration. The peer configuration is thus propagated via peer-to-peer networking to the peer device. The peer device boots-up using the peer configuration retrieved from the master device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
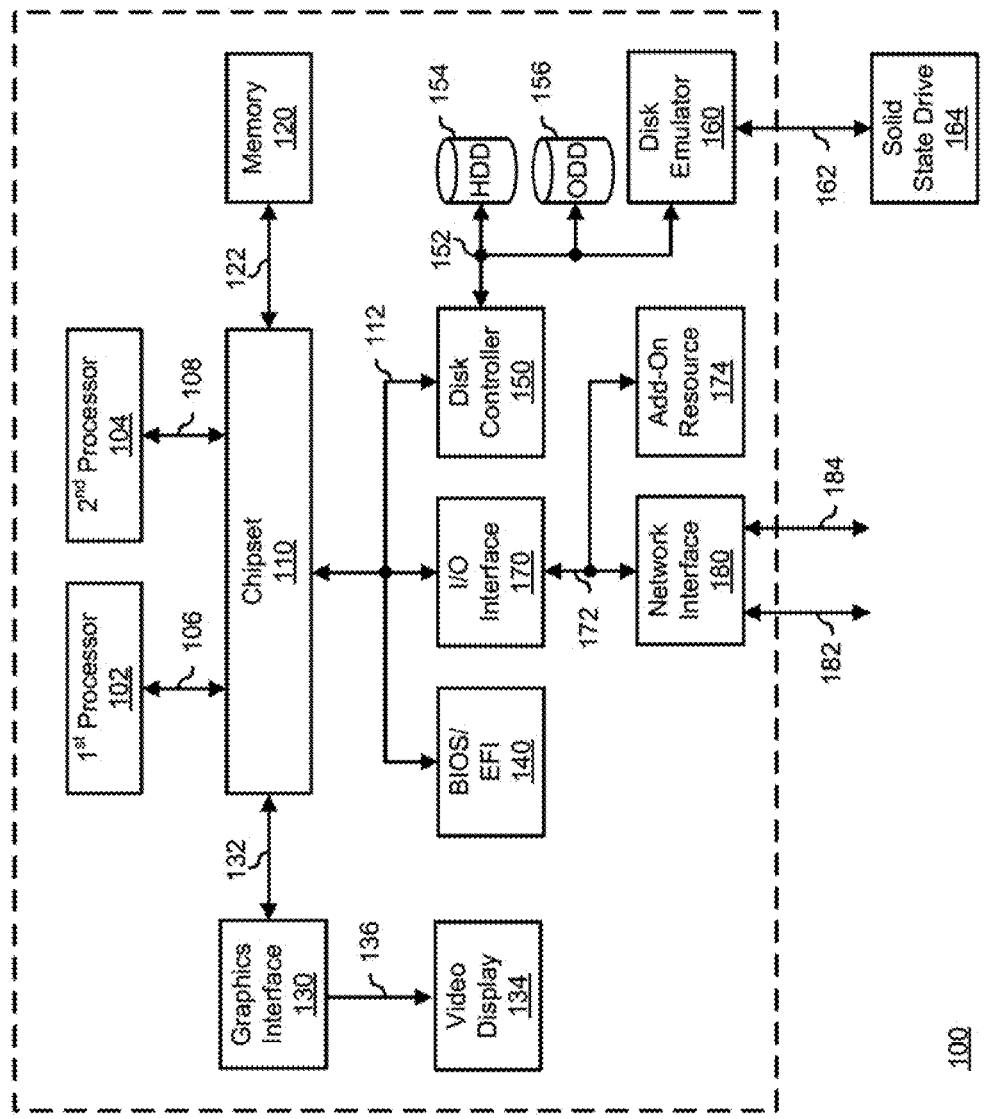
FIG. 1 is a block diagram illustrating an information handling system according to an embodiment of the present disclosure.

FIG. 1 illustrates a generalized embodiment of information handling system 100 that includes processors 102 and 104, a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
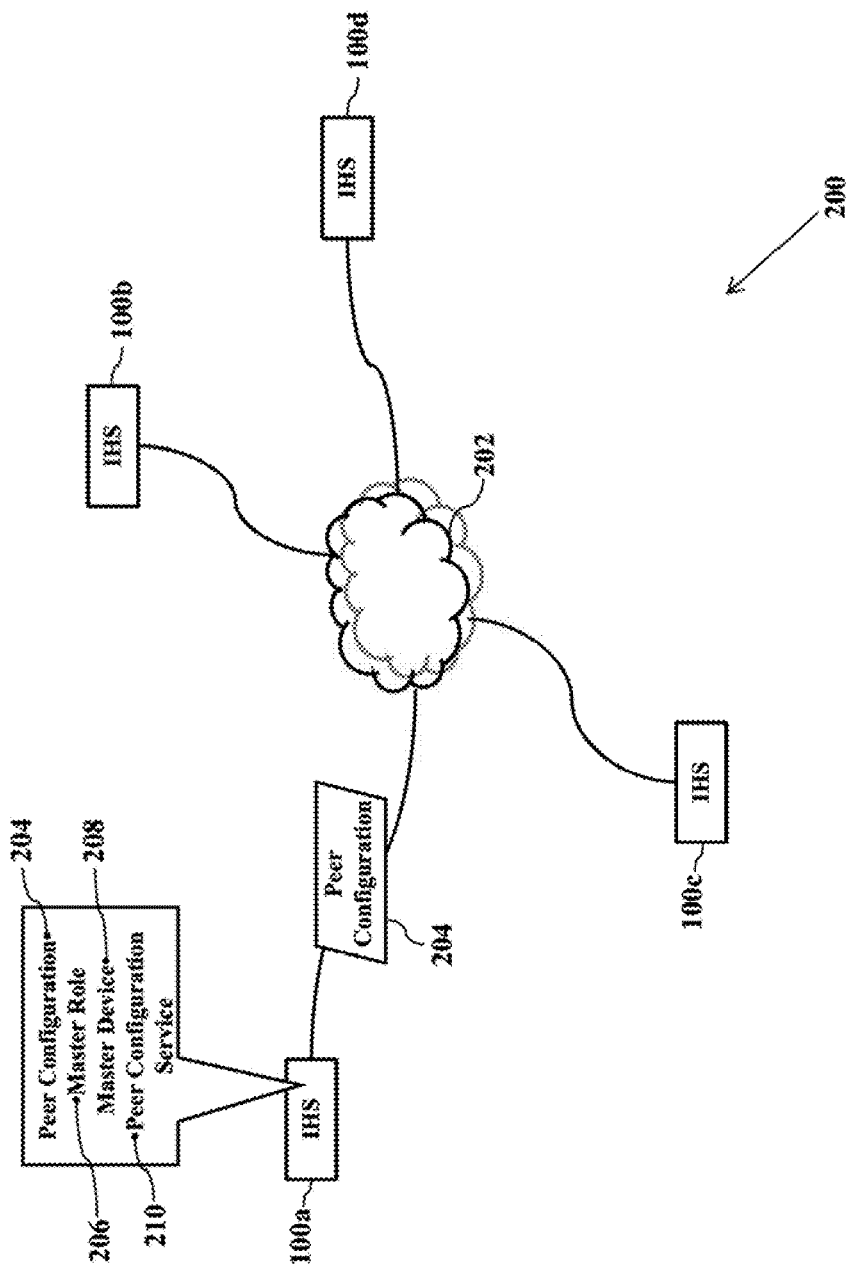
FIG. 2 illustrates a peer-to-peer networking environment, according to exemplary embodiments.

FIG. 2 illustrates a peer-to-peer networking environment 200, according to exemplary embodiments. Here multiple information handling systems (IHS) 100a-d communicate with each other via a communications network 202. For simplicity, FIG. 2 only illustrates four (4) information handling systems 100a-d. In practice, though, there may be many devices, perhaps even hundreds of machines. Regardless, exemplary embodiments distribute a peer configuration 204 among the information handling systems 100a-d. As the reader likely understands, computers, servers, mobile devices, and other information handling systems 100a-d may need to be configured with an administrator's desired settings, rules/policies, permissions, membership, peer-to-peer connections, Internet protocol (IP) addresses, and many other controls. Here, though, the peer configuration 204 is implemented in a peer scheme without the intervention of a management server. That is, one of the information handling systems (such as 100a) shares its peer configuration 204 via the communications network 202 with the other information handling systems 100b-d. Once the peer configuration 204 is established at the information handling system 100a (such as by local and/or remote administration), the information handling system 100a assumes a master role 206 and becomes a master device 208. The master device 208 is thus authorized to apply the same peer configuration 204 to the other information handling systems 100b-d. In other words, the master device 208, having the master role 206, provides a peer configuration system 210 that sends or downloads the peer configuration 204 to the other information handling systems 100b-d. As later paragraphs will explain, the peer configuration 204 may thus be transferred or distributed in a peer-to-peer fashion in response to requests from peer devices.

The peer configuration 204 differs from local configuration. As the reader likely understands, conventional configuration may be locally performed. Local configuration (Local Config) allows customers to manually configure computers on a per-device basis. As the reader may understand, a user or an IT administrator may access a Windows® local settings tool or folder to select and to configure user level settings, user permissions, resolutions, peripherals, and virtual desktop settings. An engine (such as the processors 102-104 executing software) applies those configurations to the local machine. Once the settings are applied, the configuration is locked and provides the end user with a consistent user experience on every reboot. Because local configuration is manually established at each device (one at a time), local configuration is only used in small networking environments (perhaps less that several machines). Local configuration is simply too time-consuming and laborious for small-to-medium sized networks. The peer configuration system 210, instead, automatically propagates the peer configuration 204, thus saving time, money, and effort.

The peer configuration 204 also differs from conventional remote configuration. Remote configuration (Remote Config) allows customers to configure computers over the communications network 202 using a dedicated server and a corresponding client-side application installed on each computer. Remote configuration thus requires dedicated server-class hardware, big database capabilities, high-bandwidth networking, load balancing, and regular patching/maintenance and software upgrades. This conventional, extensive, and expensive setup can only be justified for large, enterprise networking environments that require configuring many hundreds or thousands of clients.

The peer configuration system 210 thus fulfils a niche. The peer configuration system 210 distributes the peer configuration 204 in a peer-to-peer fashion. Small business customers, for example, benefit from the peer configuration system 210 by efficiently copying and transferring the peer configuration 204 to as little as ten (10) machines. The peer configuration system 210, in other words, is economical for small-to-medium sized networks. The peer configuration system 210 may thus be targeted to small networking environments. Exemplary embodiments thus efficiently configure a small-to-medium sized peer network without the burden of a dedicated management server.

Exemplary embodiments thus provide peer-to-peer configuration. That is, exemplary embodiments offer a serverless network infrastructure and networking technology that allows the master device 208 to share resources and to communicate directly with peer devices via the communications network 202. The peer devices (such as end points or nodes) interact and pass data to and from each other in the form of a record. Each peer device has a unique network identity.

Figure 3:
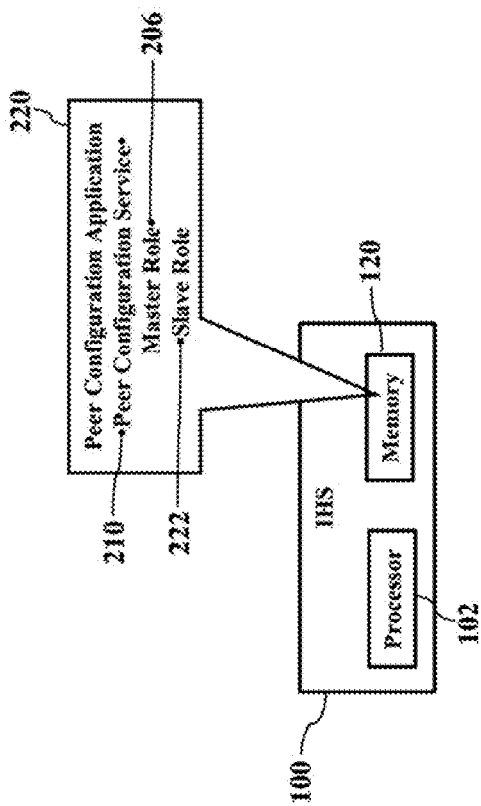
FIGS. 3-5 are simple illustrations of a peer configuration system, according to exemplary embodiments.
Figure 4:
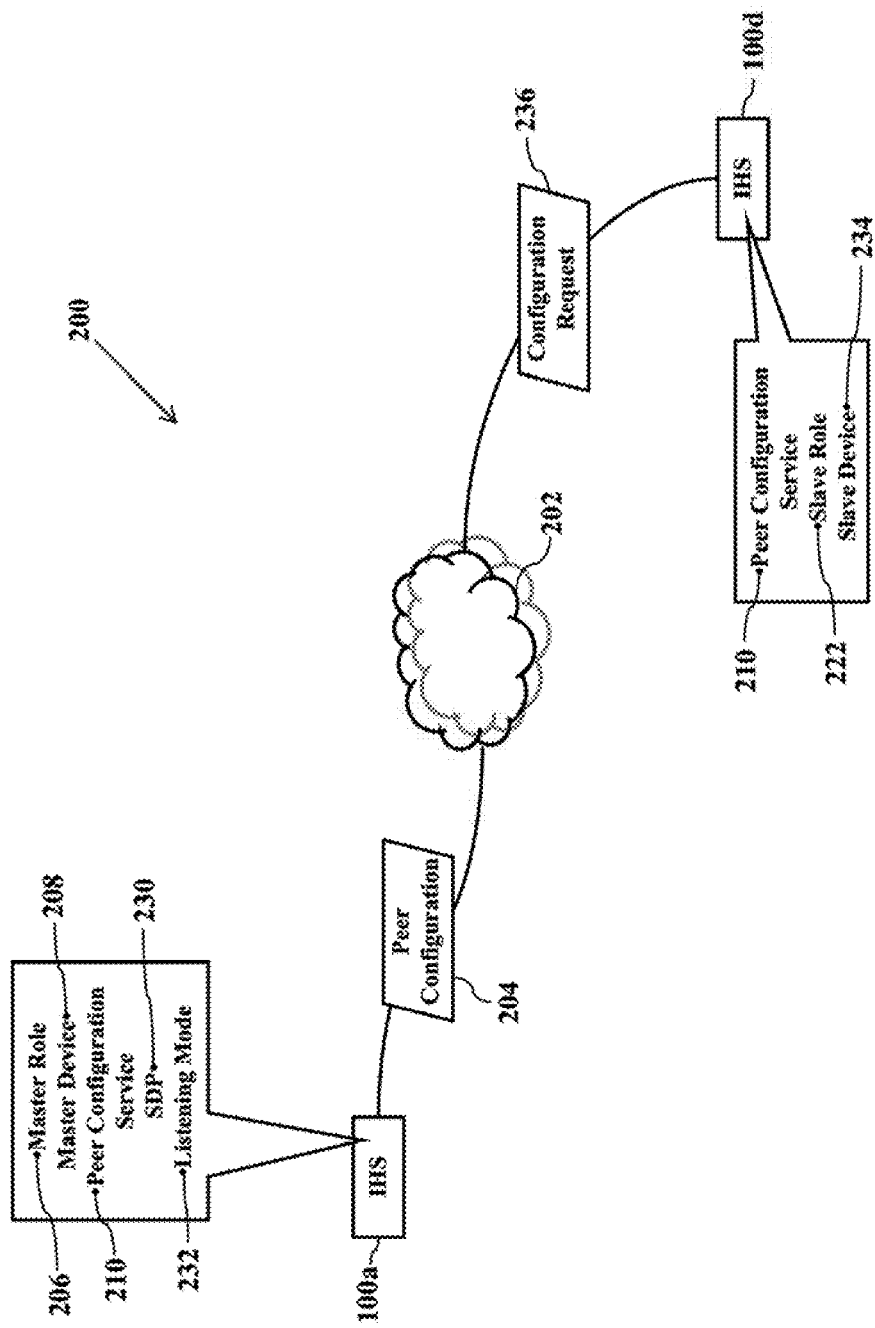
Figure 5:
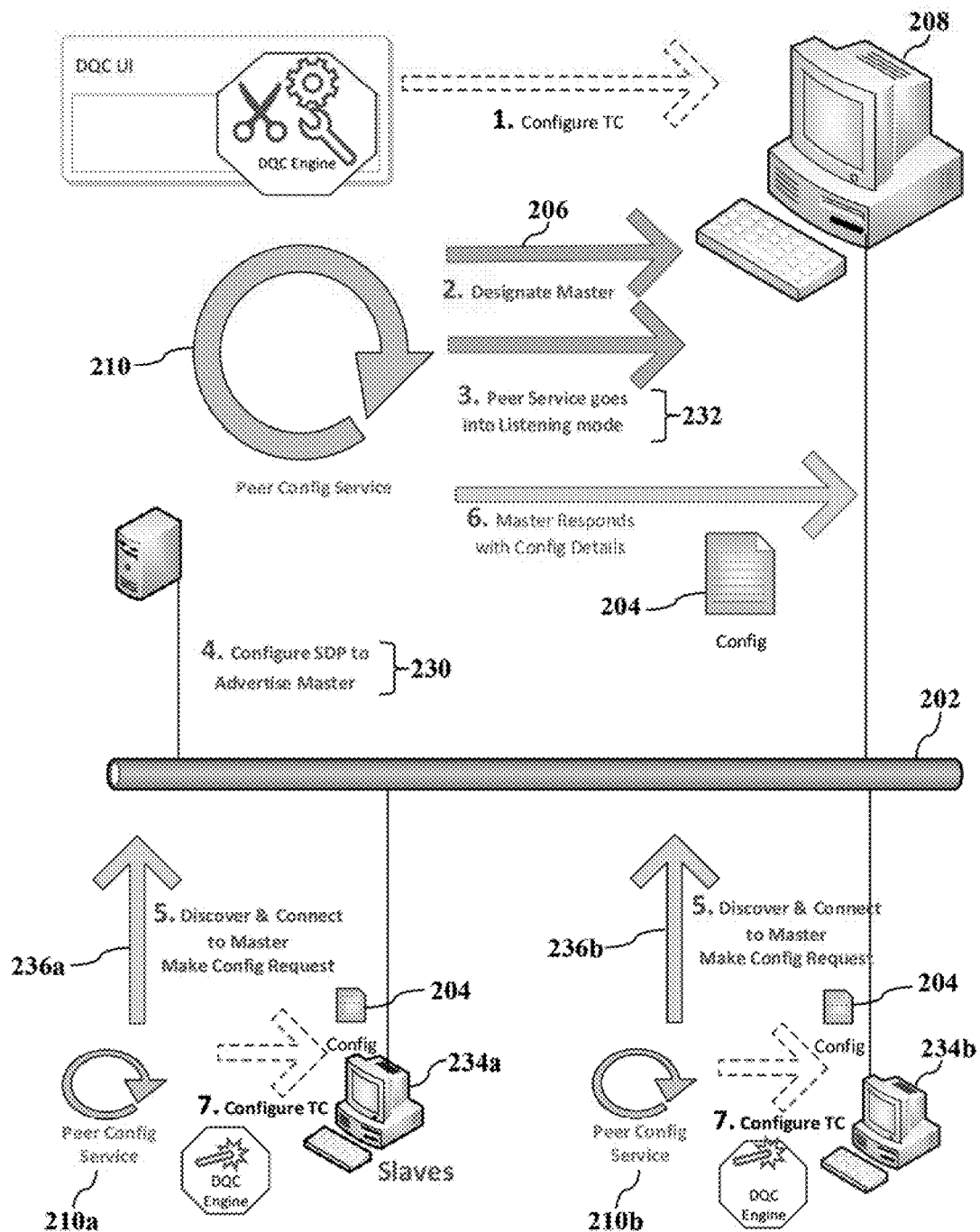

FIGS. 3-5 are simple illustrations of the peer configuration system 210, according to exemplary embodiments. Again, for simplicity, only the four (4) information handling systems 100a-d are shown. As this disclosure explains, though, in practice the peer configuration system 210 may be implemented for any number of computers, machines and devices, as is commonly found in many networking environments. As FIG. 3 illustrates, each information handling system 100 performs at least some aspect or portion of the peer configuration system 210. The processor 102, for example, executes a peer configuration application 220. FIG. 3 illustrates the peer configuration application 220 stored within the local memory 120, but the peer configuration application 220 may be stored in some other local or remotely accessible memory. Regardless, the peer configuration application 220 instructs the processor 102 to perform operations, such as assuming the master role 206 or a slave role 222. The information handling system 100 will then perform other operations, depending on the master role 206 or the slave role 222.

FIGS. 4-5 further illustrate role play. An administrator selects any of the information handling systems 100 for the master role 206. Assume, for example, that the administrator designates and configures the information handling system 100a for the master role 206. The administrator establishes the peer configuration 204 (perhaps using a tools menu and a user interface), and the peer configuration 204 is saved to the master device 208 assigned the master role 206. The master role 206 may then be advertised on the communications network 202 (perhaps using one or more messages via a Service Discovery Protocol (SDP) 230). The master device 208 may thus solicit its master role 206 via the communications network 202 to the other information handling systems (such as 100d).

The master device 208 then awaits configuration requests. The master device 208 (configured for the master role 206) enters a listening mode 232. The peer configuration system 210 (operating on the other information handling system 100d) discovers the master role 206 available on the communications network 202. Because the master role 206 has been designated, the peer configuration system 210 operating on the other information handling system 100d defaults to the slave role 222. The information handling system 100d may thus assume the slave role 222 and functionally become a slave device 234. The slave device 234 (perhaps having defaulted to the slave role 222) sends a configuration request 236 via the communications network 202 to the network address (such as an IP address) specified by the master device 208 assigned the master role 206. When the master device 208 receives the configuration request 236, the master device 208 retrieves the peer configuration 204 and return sends the peer configuration 204 to the network address or IP address specified by the configuration request 236. The peer configuration system 210 thus sends the peer configuration 204 as a response to the configuration request 236. The slave device 234 thus receives and installs the peer configuration 204, thus self-configuring the slave device 234 to an identical or nearly identical configuration state.

The peer configuration system 210 thus offers an elegant solution. The peer configuration system 210 provides a new mechanism for deploying configuration information to endpoint devices, thus eliminating the need for a management server (or even .ftp or file server). The peer configuration system 210 assigns a "dual personality" (the master role 206 or the slave role 222) for each networked device. That is, any endpoint may be designated as the "master," and any number of additional devices may be trivially designated as alternate masters (as later paragraphs will explain). Moreover, the peer configuration system 210 may be pre-installed (perhaps by a manufacturer or retailer) on to the information handling system 100 (such as an OS image), thus eliminating the need for installing/deploying special configuration management software at a customer site. The peer configuration system 210 provides the benefits typically associated with a server infrastructure (such as high availability and load balancing) without the expense and infrastructure (backups, patching, security).

More details of the peer configuration system 210 are provided. When the administrator selects any machine for the master role 206, the administrator launches the peer configuration application 220 (perhaps via a user interface for a quick configuration tool, as FIG. 3 illustrates). The administrator creates the peer configuration 204, and the peer configuration 204 may be saved in any format (such as an XML or JSON format). The master role 206 may then be advertised and the master device 208 enters the listening mode 232. Once the other peer devices are informed of the master role 206, the other peer configuration applications 220 default to the slave role 222. The slave devices 234 send their respective configuration requests 236 to read the peer configuration 204 available from the master device 208. Exemplary embodiments may make the peer configuration 204 network accessible by using any standard protocols like WINDOWS® Network Share or an HTTP Listening Service and Response. Once the peer configuration 204 is retrieved, the slave devices 234 install or apply the peer configuration 204. The peer configuration 204 is thus replicated throughout the peer-to-peer networking environment 200.

Exemplary embodiments may advertise the master role 206. The Service Discovery Protocol 230, for example, may distribute or solicit a notification (such as a message) to some or all devices via the communications network 202. The notification message specifies the network address (or IP address) associated with the master device 208 assigned the master role 206. Exemplary embodiments, for example, may utilize DHCP tags/options, DNS SRV records, and/or the Service Location Protocol (SLP), which are all well-known and need not be further explained. Moreover, if the master role 206 is not advertised and/or discovered, the peer configuration application 220 may close. Indeed, the peer configuration application 220 may even cause a system shutdown to prevent damage, corruption, or rogue activity.

The slave role 222 is further explained. When any machine boots up, the peer configuration system 210 may automatically default to the slave role 222 and request the peer configuration 204 (as above explained). The different peer configuration systems 210, for example, may randomly send the configuration request 236 to avoid congestion and balance loads on the master device 208. That is, the slave devices 234 may reach out to the master device 208 at periodic times (daily or at boot), but each configuration request 236 may be randomized to prevent simultaneous queries. The slave devices 234 may connect to the master device 208 using any network protocol (such as HTTP GET or Windows Network Share).

The slave is configured. Once the peer configuration system 210 operating on the slave device 234 retrieves or reads the peer configuration 204, the slave device 234 implements the peer configuration 204 using a quick configuration tool. The peer configuration system 210 may locally store a copy of the peer configuration 204. Once configuration is complete, the peer configuration system 210 on the slave device 234 may stop operation or execution.

Figure 6:
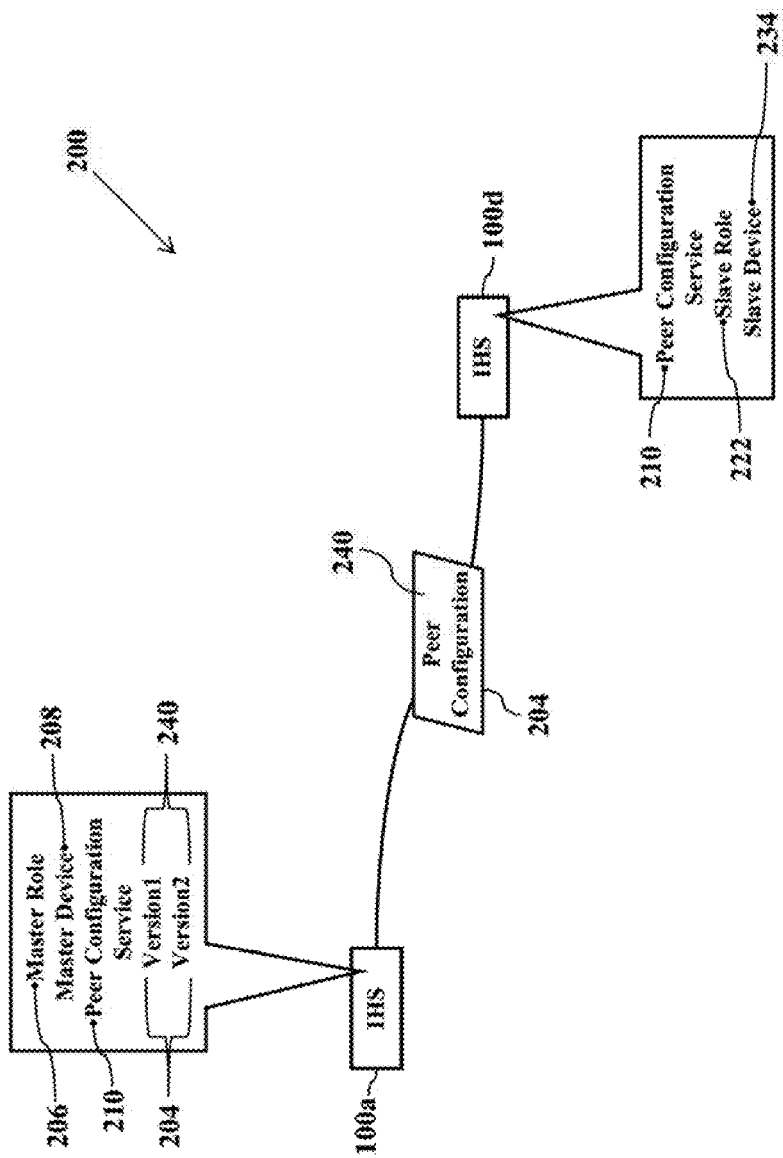
FIG. 6 illustrates configuration versions, according to exemplary embodiments.

FIG. 6 illustrates configuration versions, according to exemplary embodiments. Here exemplary embodiments may implement different versions 240 of the peer configuration 204. The administrator may update different peer configurations 204 using the quick configuration tool over a time as requirements change. When the administrator changes or updates the peer configuration 204, the change or update may be saved as a newer version 240 of the peer configuration 204 for later use. For a slave device 234 that is already setup with an older version 240 of the peer configuration 204, the peer configuration system 210 on boot up (or other periodic timing) may connect to the master device 208 and compare the versions 240 (perhaps based on time stamps detailing a currently stored version and a more recent or latest version). If the peer configuration system 210 discovers or reads a newer version 240 offered by the master device 208, the slave device 234 may read the newer version 240 and update itself. Exemplary embodiments thus provide a convenient and simple method to upgrade to newer peer configuration file settings.

Figure 7:
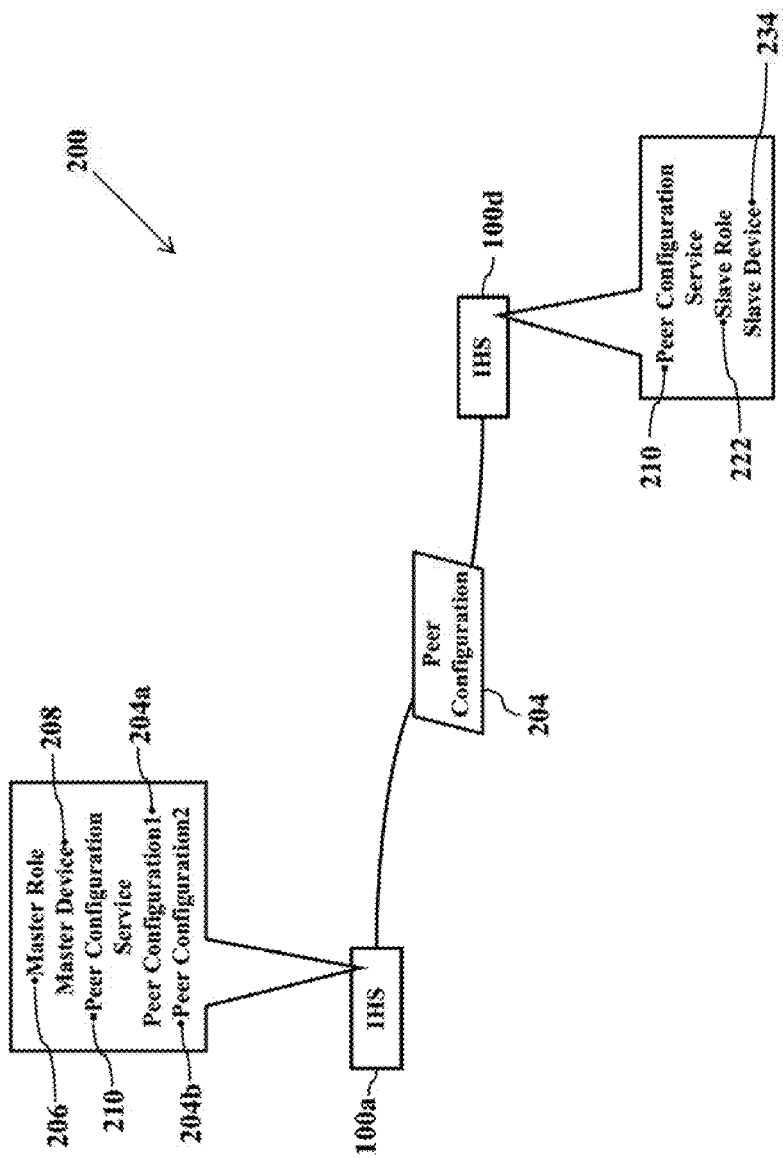
FIG. 7 illustrates multiple configurations, according to exemplary embodiments.

FIG. 7 illustrates multiple configurations, according to exemplary embodiments. Here exemplary embodiments may implement multiple, different peer configuration (such as 204a and 204b). Recall that the peer configuration 204 is stored on the master device 208 having the master role 206. Each peer configuration 204a and 204b may thus have a unique filename, storage location, date/time, and other metadata. Exemplary embodiments may thus allow the administrator to create multiple peer configurations 204 as different configuration files. Different slave devices 234 may thus be configured with different peer configurations 204, thus allowing a variety of different settings, permissions, and other configurations. For example, a variety of factors can be used for setting up multiple machines with different configurations, such as functional role (Engineering, Finance, Sales), time zone, location, IP address, IP address range, IP subnet, and any other descriptional factors.

The administrator may even select how to configure multiple devices with different configurations. For example, some machines may be organized as a group and a single peer configuration (such as 204a) applied to each member machine in the group. Again, groupings may be based on functional role, department, time zone, location, IP addresses/range/subnet. An end user may have authority to select his or her desired peer configuration (such as 204b), perhaps via a menu-driven option listing. The administrator may even preselect or present one of the peer configurations 204 prior to deployment to the slave device 234 (again perhaps based on group or end user). Another option may permit the administrator to reset the peer configuration 204 being used on any of the slave devices 234, based on a different role, group, or user. The peer configuration system 210, for example, at launch may have menu options for resetting and/or selecting a desired peer configuration 204.

Exemplary embodiments may utilize templates. As this disclosure previously explained, the peer configuration 204 may include virtual desktop settings, user permissions, lockdown features, and other settings commonly used in Windows embedded systems. The peer configuration system 210 may accelerate configuration deployment by providing different templates for a corresponding different peer configuration 204. These templates can be used by the administrator as a starting point to create their own unique set of the peer configurations 204.

Figure 8:
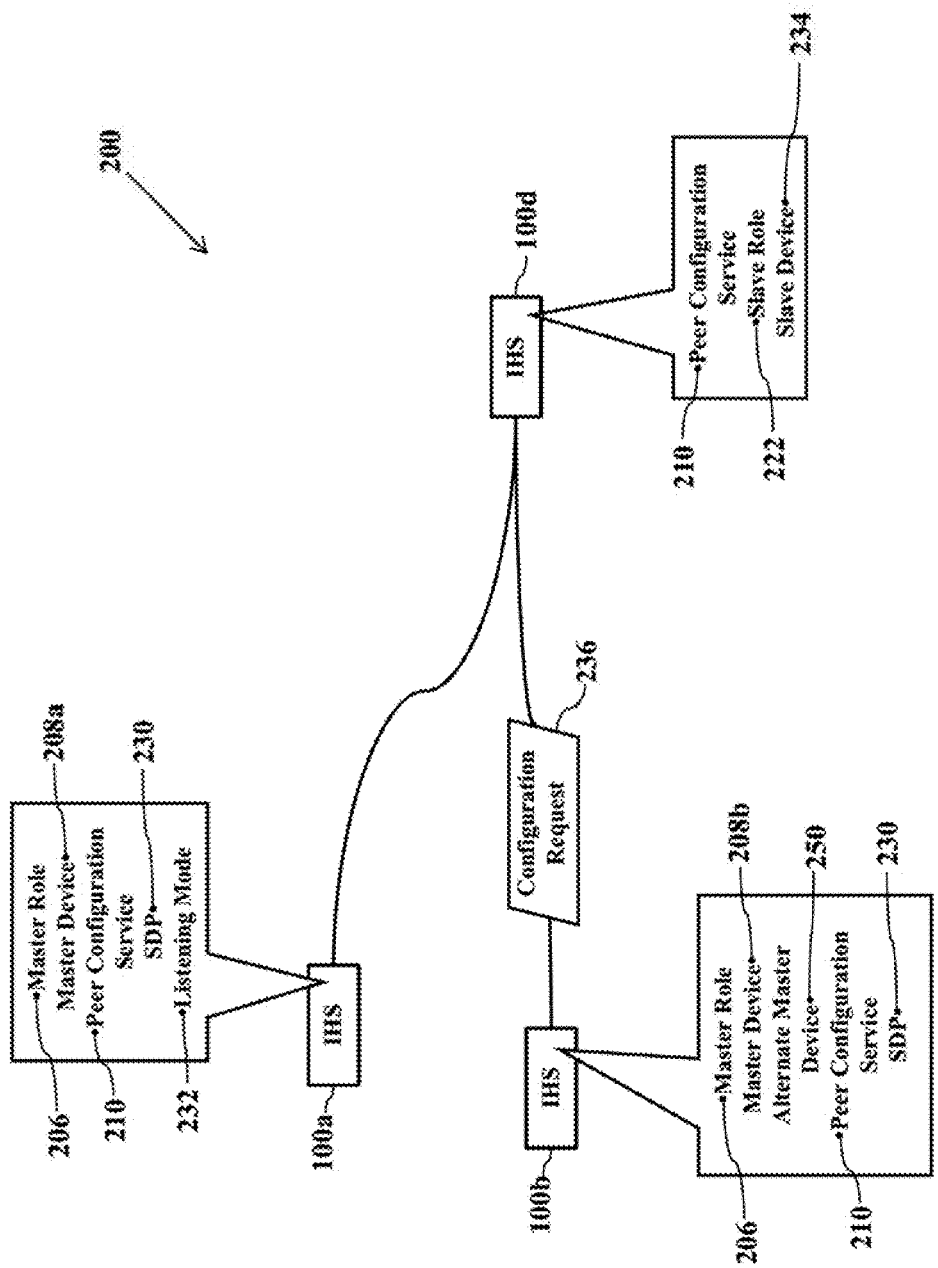
FIG. 8 illustrates multiple masters, according to exemplary embodiments.

FIG. 8 illustrates multiple masters, according to exemplary embodiments. Because there may be many machines communicating via the communications network 202, a single master device 208a may be inadequate to serve the configuration needs of the networked machines. Indeed, with multiple computers, thin clients, servers, and mobile devices, there may be many different peer configurations 204 as above explained. So, depending on network complexity and the number of the peer configurations 204 used, exemplary embodiments may permit the administrator to designate multiple master devices 208 having the same or different master roles 206. Some masters could be alternates, while other masters may be dedicated to a particular peer configuration 204. FIG. 8, for example, illustrates a first master device 208a and a second master device 208b. The second master device 208b may thus offer an additional configuration to the service discovery protocol 230 that specifies the network location associated with an alternate master device 250. The peer configuration system 210 (operating on the alternate master device 250) may initially perform the operations of a slave device 234 (that is, read the peer configuration 204 from the master device 208 and store a copy). The peer configuration system 210 (operating on the alternate master device 250) may then switch to the master role 206 and listen for the configuration request 236 from any slave.

The alternate master device 250 increases configuration capacity. As the reader may imagine, a single master device (such as 208a) serving many slaves may quickly be overwhelmed with the configuration requests 236. The designation of the alternate master device 250 provides additional network locations for obtaining the peer configuration 204. So, if a particular slave device 234 fails to connect to the master device 208a (perhaps after a defined number of attempts), the slave device 234 may query the alternate master device 250 for the peer configuration 204. The alternate master device 250 increases the availability of the peer configuration 204, especially when the master device 208a is rebooting, not powered on, or otherwise unreachable. Response times are reduced and machine/network productivity increases.

The alternate master device 250 also balances loads. Any slave may randomly select the designated master device 208 and/or the alternate master device 250 for retrieving the peer configuration 204. Multiple sources for the peer configuration 204 provides a load balancing technique without requiring a specific setup or software dedicated to load balancing technology.

Figure 9:
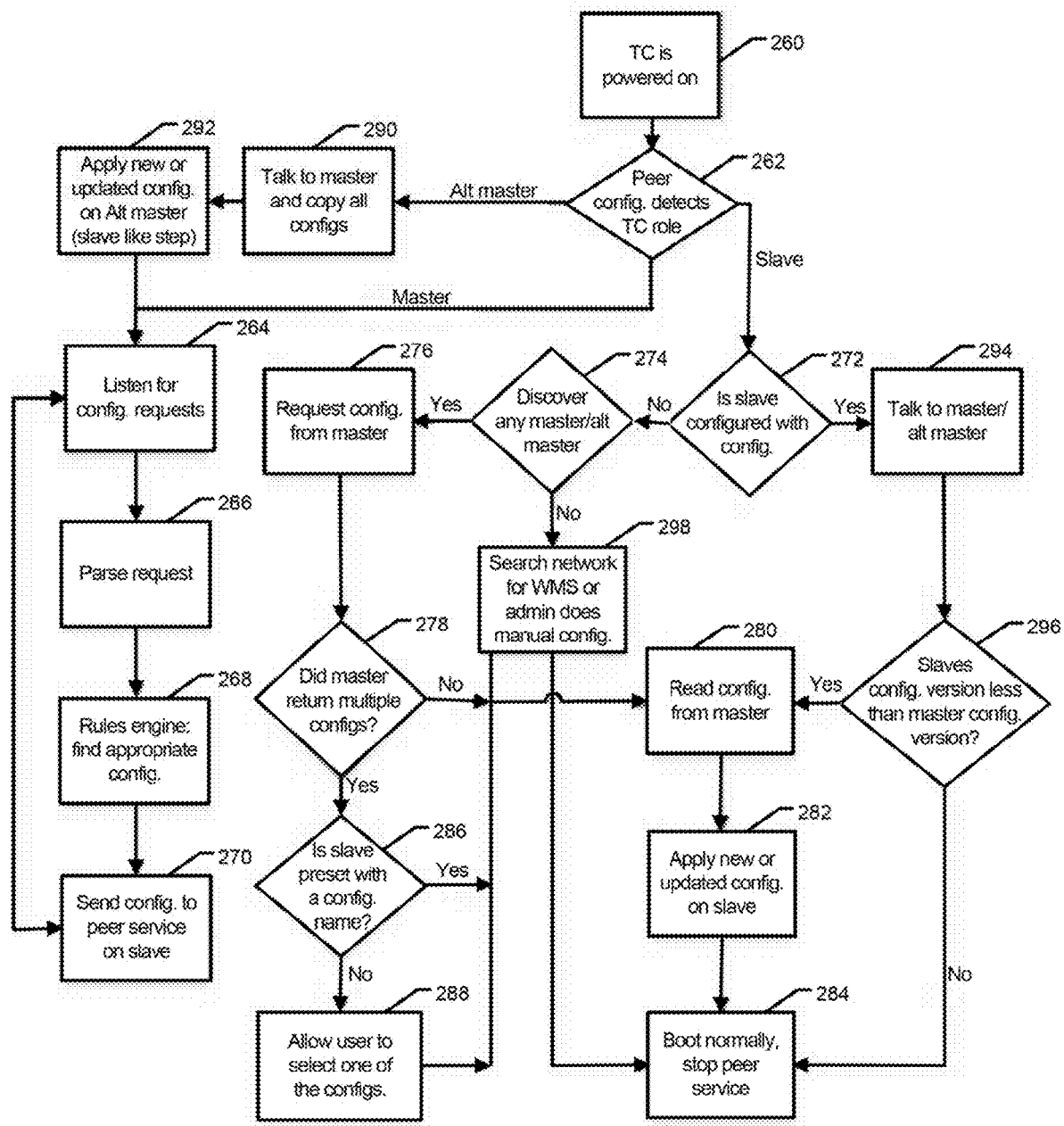
FIG. 9 is a flowchart illustrating a method or algorithm for peer configuration, according to exemplary embodiments.

FIG. 9 is a flowchart illustrating a method or algorithm for peer configuration, according to exemplary embodiments. The information handling system 100 (such as a "thin client" or TC) is powered on (Block 260) to receive electrical power such as a current and voltage. The information handling system 100 may suspend a boot-up procedure or sequence and determines its role play in the peer configuration system 210 (Block 262). For example, if the information handling system 100 is designated or configured for the master role 206, the master device 208 resumes and/or completes the boot-up and enters the listening mode 232 (Block 264) and monitors for the configuration request 236 from a peer device. Once the configuration request 236 is received, the configuration request 236 may be parsed (Block 266) to determine data or information needed for the peer configuration system 210 (such as the appropriate version 240, grouping, and/or network address). The master device 208 may then identify a set of rules (Block 268) that identify the correct peer configuration 204 for the slave device 238 sending the configuration request 236. The set of rules may be logical statements that apply data or information (such as determined from the parsing of the configuration request 236) that determines the peer configuration 204 that is specified for the slave device 238. The master device 208 may then send the peer configuration 204 into the peer-to-peer networking environment 200 for routing and/or delivery to the slave device 238 (Block 270). The master device 208 may then resume the listening mode 232 for another configuration request 236 (Block 264).

The information handling system 100 may optionally be a slave. When the information handling system 100 determines its role play (Block 262), the information handling system 100 may default or revert to the slave role 222. If the slave device 234 requires configuration (Block 272) during the boot-up, the slave device 234 discovers the master device 208 (Block 274) (such as by monitoring for receipt of the SDP 230 or some other message notification). The slave device 234 sends the configuration request 236 (Block 276) and awaits a receipt of the peer configuration 204. If the master device 208 only sent a single peer configuration 204 (Block 278), then the slave device 234 reads the peer configuration 204 (Block 280) to resume or continue the boot-up applying the peer configuration 204 (Block 282). The peer configuration system 210 may then stop, as the peer configuration 204 was successfully applied during the boot-up (Block 284).

Multiple peer configurations 204 may have been received. As FIG. 9 illustrates, when the slave device 234 sends the configuration request 236 (Block 276), the master device 208 may send multiple, different peer configurations 204 (Block 278). The slave device 234 may filter or identify the correct or desired peer configuration 204, such as matching a name or other descriptor with the appropriate peer configuration 204 (Block 286). However, if the multiple, different peer configurations 204 are not associated with the name or other descriptor (Block 286), then the peer configuration application 220 may generate a prompt (such as a selection menu or control in a graphical user interface) on a display device for the user to make a selection of her desired peer configuration 204 (Block 288). Regardless, the slave device 234 reads the peer configuration 204 (Block 280), applies the peer configuration 204 (Block 282), and continues the boot-up (Block 284).

The information handling system 100 may optionally be an alternate master. When the information handling system 100 determines its role play (Block 262), the information handling system 100 assume the master role 206 as the alternate master device 250 (as earlier explained). The alternate master device 250 may thus connect to the master device 208 and retrieve electronic copies of any, some, or all of the peer configurations 204 (Block 290). Because the alternate master device 250 may be booting up and require configuration, the alternate master device 250 may select and/or apply the appropriate peer configuration 204 (Block 292). Once the alternate master device 250 completes boot-up, the alternate master device 250 assumes the master role 206 and enters the listening mode 232 (Block 264). When the alternate master device 250 receives the configuration request 236, the configuration request 236 may be parsed (Block 266) to apply the set of rules (Block 268) that identify the correct peer configuration 204 for the slave device 238. The alternate master device 250 may then send the peer configuration 204 to the slave device 238 (Block 270) and resume the listening mode 232 (Block 264).

The slave may discover a newer version 240. When the information handling system 100 determines its slave role 222 during boot-up (Block 262), the slave device 234 may already store the peer configuration 204 (Block 272). Regardless, the slave device 234 may still query the master device 208 (Block 294) to retrieve a newer or more appropriate peer configuration 204. The slave device 234 may then compare its stored peer configuration 204 to the peer configuration 204 received from the master device 208. If the stored peer configuration 204 is older in time, version number, or other comparator (Block 296), then the slave device 234 reads the peer configuration 204 sent from the master device 208 (Block 280), applies the most recent peer configuration 204 (Block 282), and continues the boot-up (Block 284). However, if the slave device 234 already stores the most-recent peer configuration 204 (Block 296), then the slave device 234 continues the boot-up (Block 284).

Finally, the identity of the master may be unknown. When the information handling system 100 determines its slave role 222 during boot-up (Block 262), the slave device 234 may be unable to identify, and/or connect to, the master device 208 (Block 274). The slave device 234 may thus revert to a conventional remote configuration (such as via a WINDOWS® management server) or a manual local configuration (Block 298). Regardless, the slave device 234 continues the boot-up (Block 284).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
   storing, by an information handling system acting as a master device, a peer configuration associated with a master role in a peer configuration service;
   sending, by the information handling system acting as the master device, a message via a peer-to-peer networking environment to peer devices, the message specifying the master role associated with the peer configuration service and specifying a network address associated with the master device;
   receiving, by the information handling system acting as the master device, a configuration request sent during a boot-up procedure via the peer-to-peer networking environment from a peer device of the peer devices, the peer device assuming a slave role during the boot-up procedure in response to the message specifying the master role and the peer device requesting the peer configuration service during the boot-up procedure; and
   sending, by the information handling system acting as the master device, a response to the configuration request requesting the peer configuration service, the response sent via the peer-to-peer networking environment to the peer device during the boot-up procedure, the response comprising the peer configuration associated with the master role;
   wherein the peer configuration service provides the peer configuration during the boot-up procedure of the peer device.

2. The method of claim 1, further comprising storing an electronic copy of the peer configuration.

3. The method of claim 1, further comprising receiving a designation associated with the master role.

4. The method of claim 1, further comprising performing the boot-up procedure using the peer configuration.

5. The method of claim 1, further comprising storing multiple versions of the peer configuration.

6. The method of claim 1, further comprising storing multiple peer configurations.

7. The method of claim 6, further comprising associating each one of the multiple peer configurations with a corresponding name.

8. The method of claim 6, further comprising associating each one of the multiple peer configurations with a corresponding group.

9. The method of claim 6, further comprising associating each one of the multiple peer configurations with a corresponding user.

10. The method of claim 6, further comprising associating each one of the multiple peer configurations with a corresponding Internet protocol address.

11. An information handling system, comprising:
    a hardware processor; and
    a memory device accessible to the hardware processor, the memory device storing instructions that when executed cause the hardware processor to perform operations, the operations comprising:
    suspending a boot-up procedure;
    receiving a message during the suspending of the boot-up procedure, the message sent via a peer-to-peer networking connection from a master device, the message soliciting a peer configuration service available from the master device, the message specifying a master role associated with the peer configuration service and a network address associated with the master device;
    in response to the master role specified by the message from the master device, assigning a slave role during the suspending of the boot-up procedure;
    in response to the assigning of the slave role, sending a configuration request during the suspending of the boot-up procedure via the peer-to-peer networking connection to the network address associated with the master device, the configuration request requesting a peer configuration provided by the peer configuration service available from the master device;
    receiving the peer configuration during the suspending of the boot-up procedure sent via the peer-to-peer networking connection from the master device, the peer configuration sent as a response to the peer configuration service available from the master device; and
    resuming the boot-up procedure by applying the peer configuration received from the master device.

12. The system of claim 11, wherein the operations further include defaulting to the slave role in response to the master role specified by the message from the master device.

13. The system of claim 11, wherein the operations further include shutting down in response to no discovery of the master role.

14. The system of claim 11, wherein the operations further include periodically sending the configuration request via the peer-to-peer networking connection to the master device.

15. The system of claim 11, wherein the operations further include randomly sending the configuration request via the peer-to-peer networking connection to the master device.

16. The system of claim 11, wherein the operations further include storing an electronic copy of the peer configuration.

17. The system of claim 11, wherein the operations further include pausing the boot-up procedure to send the configuration request.

18. The system of claim 11, wherein the operations further include receiving a designation associated with an alternate master device associated with the master role.

19. The system of claim 18, wherein the operations further include querying the alternate master device for the peer configuration.

20. A memory device storing instructions that when executed cause a hardware processor to perform operations, the operations comprising:

assigning a dual personality associated with a peer configuration service;

receiving a designation of a master role associated with the dual personality associated with the peer configuration service;

in response to the designation of the master role, sending a message via a peer-to-peer networking connection to a slave device, the message specifying a network address associated with a master device designated the master role in the peer configuration service;

receiving a configuration request sent during a suspended boot-up procedure via the peer-to-peer networking connection from the slave device, the slave device defaulting to a slave role associated with the dual personality and suspending the boot-up procedure in response to the message specifying the network address associated with the mast device designated the master role, the configuration request requesting the peer configuration service available from the master device; and sending a peer configuration via the peer-to-peer networking connection to the slave device that suspended the boot-up procedure, the peer configuration sent in response to the configuration request requesting the peer configuration service available from the master device.

\* \* \* \* \*